UNITED STATES PATENT OFFICE.

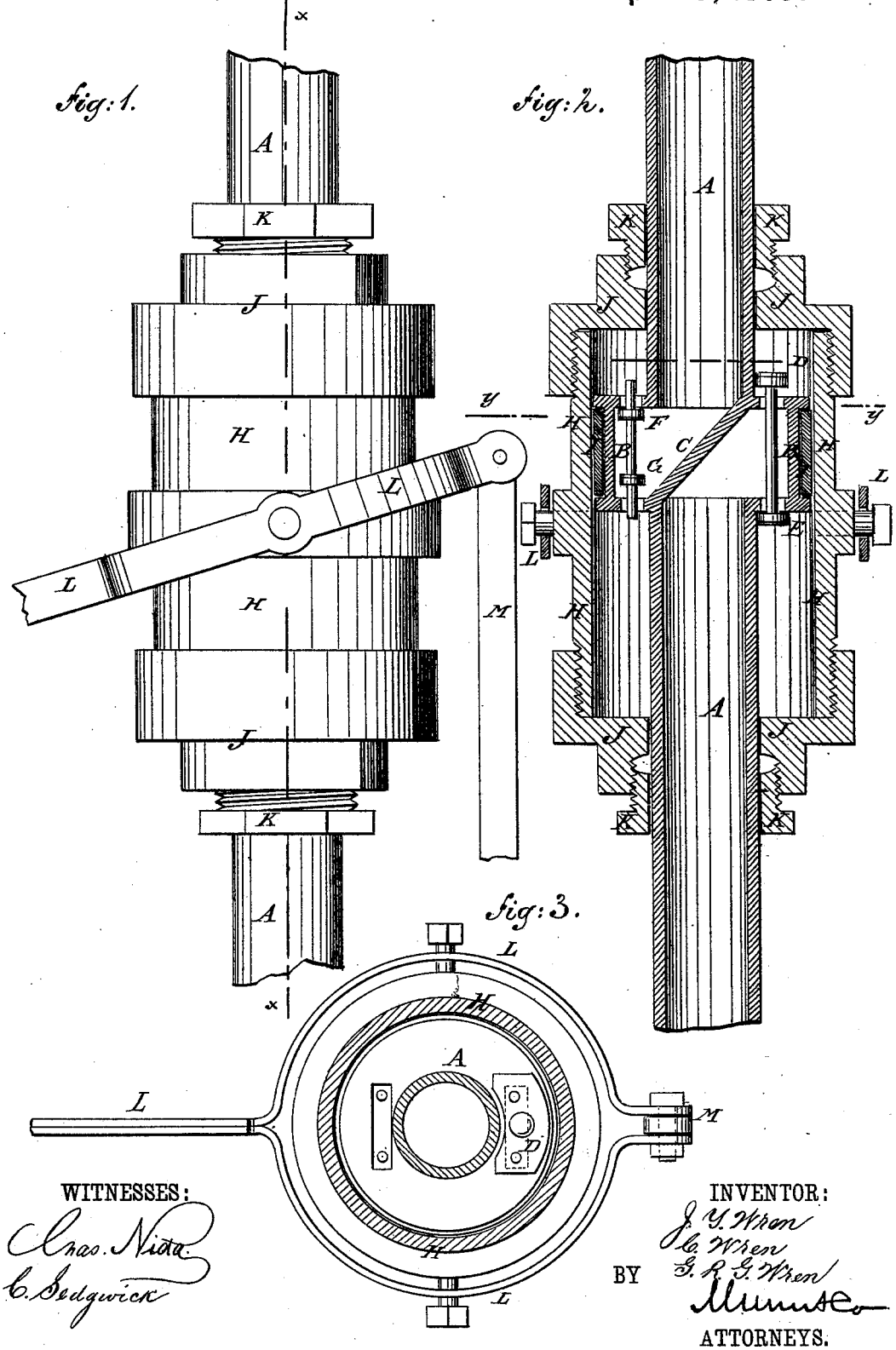

JOHN Y. WREN, CHRISTOPHER WREN, AND GEORGE R. G. WREN, OF PLYMOUTH, PENNSYLVANIA.

IMPROVEMENT IN PUMPS.

Specification forming part of Letters Patent No. 214,228, dated April 8, 1879; application filed August 6, 1878.

*To all whom it may concern:*

Be it known that we, JOHN Y. WREN, CHRISTOPHER WREN and GEORGE R. G. WREN, of Plymouth, in the county of Luzerne and State of Pennsylvania, have invented a new and Improved Pump, of which the following is a specification.

Figure 1 is a side view of our improved pump. Fig. 2 is a longitudinal section of the same, taken through the line $x\,x$, Fig. 1. Fig. 3 is a cross-section of the same, taken through the broken line $y\,y$, Fig. 2.

Similar letters of reference indicate corresponding parts.

The object of this invention is to furnish an improved pump, simple and compact in construction, inexpensive in manufacture, and not liable to get out of order, and easily accessible for repairs in all its parts when required.

The invention will first be described in connection with the drawings, and then pointed out in the claim.

A is a pipe, extending from the point where the water or other liquid is to be discharged to the tank, cistern, well, pipe, or other reservoir whence the liquid is to be taken. At some suitable point in the pipe A is formed a cylindrical enlargement, B, which is divided into two parts by an inclined partition, C, the space above the said partition opening into the upper or discharge part of the pipe A, and the space below the said partition opening into the lower or receiving part of the said pipe A. Through the upper and lower walls of the receiving part of the enlargement B are formed openings, which are closed by the two valves D E, the upper valve, D, opening upward and the lower valve, E, opening downward. The valves D E may both be attached to the same stem, as shown in Fig. 2, as one is always open when the other is closed, or they may be entirely independent of each other, as may be desired.

In the upper and lower walls of the discharging part of the enlargement B are formed two openings, which are closed by two valves, F G, the upper valve, F, opening downward and the lower valve, G, opening upward. The valves F G may also be attached to the same stem, as shown in Fig. 2, as one will always be open when the other is closed, or they may be entirely independent of each other, as may be desired. The valves D E F G may be of any ordinary construction.

The cylindrical enlargement B is fitted into a cylinder, H, and has a wide groove formed in its outer surface to receive any ordinary packing, I, so that it may work water-tight within the said cylinder H. The cylinder H may be of any desired length, according to the required length of the stroke, and is closed at its upper and lower ends by heads J through holes in the centers of which the upper and lower parts of the pipe A pass. The heads J are screwed upon the ends of the cylinder H, or may be secured to said ends by bolts or other suitable means. The heads J are provided with stuffing-boxes K, through which the pipe A also passes, so that the said pipe may work in the said heads water-tight.

L is a lever, through a hole in which the cylinder H passes, and which is pivoted to the opposite sides of the said cylinder H by pins or bolts. One end of the lever L is pivoted to a post, M, or other suitable fulcrum, and the power to work the pump is applied to its other end.

The pump may be worked by hand, by steam, or by any other convenient power.

In working the pump the cylinder H is reciprocated by means of the lever L upon the stationary or fixed pipe A, and when moved downward the air or liquid in the upper part of the said cylinder H will close the valve D, open the valve F, pass into the discharging part of the enlargement B, and pass out through the upper part of the pipe A. At the same time the tendency to form a vacuum in the lower part of the cylinder H will close the valve G and open the valve E, causing the liquid to rise through the lower part of the pipe A and fill the lower part of the said cylinder H. When the cylinder H is moved upward the liquid in its lower part will close the valve E, open the valve G, and pass out through the upper part of the pipe A. At the same time the valve F will close, the valve D will open, and the liquid will pass up through the lower part of the pipe A into the upper part of the said cylinder, ready to be forced out in turn.

We are aware that there is a class of water-meters in which a hollow piston provided with valves is reciprocated in a stationary cylinder by the action or flow of water from the main; but no such meter can be used for pumping purposes, and therefore it does not conflict with our invention.

Having fully described our invention, what we claim as new is—

A pump consisting, essentially, of the fixed pipe A, enlargement B, diaphragm C, valves D E F G, and corresponding openings in the top and bottom of enlargement B, cylinder H, and forked lever L, and post M, all combined for operation as shown and described.

JOHN Y. WREN.
    CHRISTOPHER WREN.
    GEORGE R. G. WREN.

Witnesses to the signature of J. Y. Wren:
 JAMES T. GRAHAM,
 J. H. SCARBOROUGH.

Witnesses to the signatures of C. Wren and G. R. G. Wren:
 AUGUSTUS B. CLEWELL,
 JOS. W. CAMPBELL.